(12) United States Patent
Ishikawa (10) Patent No.: US 12,373,158 B2
(45) Date of Patent: Jul. 29, 2025

(54) CONTROL DEVICE AND CONTROL METHOD

(71) Applicant: Faurecia Clarion Electronics Co., Ltd., Saitama (JP)

(72) Inventor: Takashi Ishikawa, Saitama (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 0 days.

(21) Appl. No.: 18/616,816

(22) Filed: Mar. 26, 2024

(65) Prior Publication Data

US 2024/0329913 A1 Oct. 3, 2024

(30) Foreign Application Priority Data

Mar. 27, 2023 (JP) ................. 2023-050147

(51) Int. Cl.
| | |
|---|---|
| *G06F 3/14* | (2006.01) |
| *G06F 3/041* | (2006.01) |
| *G06F 3/04886* | (2022.01) |
| *G09G 5/14* | (2006.01) |

(52) U.S. Cl.
CPC .......... *G06F 3/1454* (2013.01); *G06F 3/0416* (2013.01); *G06F 3/04886* (2013.01); *G06F 3/1423* (2013.01); *G09G 5/14* (2013.01); *G09G 2380/10* (2013.01)

(58) Field of Classification Search
CPC ........ G06F 3/048–0486; G06F 3/0487–04886; G06F 3/14; G06F 3/1423; G06F 3/1454; G06F 3/1446; G09G 2380/10; G09G 5/14
See application file for complete search history.

(56) References Cited

U.S. PATENT DOCUMENTS

| | | | | |
|---|---|---|---|---|
| 8,677,284 | B2* | 3/2014 | Aguilar | G06F 3/0485 715/830 |
| 8,791,877 | B2* | 7/2014 | Kikuchi | H04N 7/147 345/1.3 |
| 8,954,231 | B1* | 2/2015 | Song | G01C 21/3688 701/538 |
| 10,144,290 | B2* | 12/2018 | Jang | G06F 3/0488 |
| 10,308,117 | B2* | 6/2019 | Kim | B60W 50/14 |
| 10,402,147 | B2* | 9/2019 | Gage | B60N 2/0025 |
| 10,489,100 | B2* | 11/2019 | Jaegal | G06F 3/04883 |
| 10,953,749 | B2* | 3/2021 | Kumon | B60K 35/22 |
| 11,068,054 | B2* | 7/2021 | Jung | G06F 3/013 |

(Continued)

*Primary Examiner* — Patrick F Marinelli

(74) *Attorney, Agent, or Firm* — Reising Ethington PC

(57) ABSTRACT

A control device that generates a screen displayed on a display device in a vehicle and a screen corresponding to the screen of the display device to an external device, wherein the control device includes: a selection unit for selecting the display device or the external device; a setting unit for setting an area for executing processing based on an operation input to the selected device, and for suppressing processing based on an operation input to a device other than the device selected by the selection unit; a processing unit for generating a screen based on operations associated with each area in the screen that are received by devices selected by the selection unit; and a display control unit for displaying the screen generated by the processing unit on the display device and providing a screen corresponding to the screen of the display device to the external device.

4 Claims, 6 Drawing Sheets

(56) References Cited

U.S. PATENT DOCUMENTS

| | | | |
|---|---|---|---|
| 11,693,545 B2* | 7/2023 | Ezaki | G06F 3/04883 |
| | | | 715/798 |
| 11,880,555 B2* | 1/2024 | Ezaki | G06F 3/04845 |
| 11,942,011 B2* | 3/2024 | Ezaki | G06F 3/04883 |
| 12,153,741 B1* | 11/2024 | Chiang | G09G 5/14 |
| 12,159,561 B2* | 12/2024 | Li | G09G 3/002 |
| 2004/0201544 A1* | 10/2004 | Love | G06F 3/1423 |
| | | | 345/1.1 |
| 2006/0086022 A1* | 4/2006 | Would | G06F 3/0482 |
| | | | 40/584 |
| 2010/0060549 A1* | 3/2010 | Tsern | G06F 3/167 |
| | | | 345/2.1 |
| 2010/0138780 A1* | 6/2010 | Marano | G06F 9/452 |
| | | | 715/781 |
| 2010/0220250 A1* | 9/2010 | Vanderwall | G01C 11/02 |
| | | | 455/152.1 |
| 2010/0302130 A1* | 12/2010 | Kikuchi | H04N 21/4316 |
| | | | 345/1.3 |
| 2011/0037896 A1* | 2/2011 | Lin | H04N 21/4438 |
| | | | 348/564 |
| 2012/0144347 A1* | 6/2012 | Jo | G06F 3/04817 |
| | | | 345/173 |
| 2013/0176232 A1* | 7/2013 | Waeller | G06F 3/04883 |
| | | | 345/173 |
| 2014/0015737 A1 | 1/2014 | Inoue | |
| 2017/0282717 A1* | 10/2017 | Jang | G06F 3/04883 |
| 2018/0208060 A1* | 7/2018 | Kim | B60K 35/29 |
| 2018/0232195 A1* | 8/2018 | Jaegal | G06F 3/04845 |
| 2020/0159481 A1* | 5/2020 | You | G06F 3/1423 |
| 2023/0009885 A1* | 1/2023 | Ezaki | G06F 3/04886 |
| 2023/0017397 A1* | 1/2023 | Ezaki | G06F 3/04883 |
| 2023/0024247 A1* | 1/2023 | Ezaki | G06F 3/04817 |
| 2023/0153051 A1* | 5/2023 | Cho | B60K 35/10 |
| | | | 345/3.1 |
| 2023/0182571 A1* | 6/2023 | Mekouar | H04L 67/12 |
| | | | 701/36 |
| 2024/0112642 A1* | 4/2024 | Da Silva | G06F 3/1431 |
| 2024/0321153 A1* | 9/2024 | Li | G09G 3/20 |
| 2024/0329913 A1* | 10/2024 | Ishikawa | G06F 3/0416 |

\* cited by examiner

FIG. 6

CONTROL DEVICE AND CONTROL METHOD

CROSS REFERENCE TO RELATED APPLICATION

This patent application claims the benefit and priority of Japanese Patent Application No. 2023-050147, filed on Mar. 27, 2023, the disclosure of which is incorporated by reference herein in its entirety as part of the present application.

FIELD

The present invention generally relates to a control device and control method for controlling a screen of a display device installed in a vehicle.

BACKGROUND

In-vehicle display devices capable of displaying a map and reproducing content are in use. There is also art for linking an in-vehicle display device to an external device such as a portable terminal. Patent document 1 (US Patent Application Publication No. 2014/0015737) says "[p]rovided is an information display system and a vehicle device, wherein, when connecting a vehicle device and a mobile terminal to display a screen of the mobile terminal on the vehicle device, it is possible prevent malfunction due to simultaneous operation of the mobile terminal and the vehicle device by two people and prevent further reduced convenience for occupants without interfering with concentration on driving operations."

There are times when it may not be appropriate for a driver to be able to operate the entire screen of the display device installed in the vehicle. For example, when the display device installed in the vehicle is equipped with a large touch panel display, there is a possibility that it is not appropriate for a driver to try to operate an icon or the like displayed far away.

SUMMARY

An object of the present application is to provide a control device and a control method that achieve appropriate operation of a display device and improve operability and safety.

In order to achieve the above object, one of the representative control devices of the present application is a control device that generates a screen displayed on a display device installed in a vehicle and provides a screen corresponding to the screen of the display device to an external device, provided with: a selection unit for selecting the display device or the external device; a setting unit for setting, in a portion of areas in the screen, an area for executing processing based on an operation input to the device selected by the selection unit, and for suppressing processing based on an operation input to a device other than the device selected by the selection unit; a processing unit for generating a screen based on operations associated with each area in the screen that are received by devices selected by the selection unit; and a display control unit for displaying the screen generated by the processing unit on the display device and providing a screen corresponding to the screen of the display device to the external device.

According to the present application, it is possible to achieve appropriate operation of the display device. The following description of the embodiments will elucidate the problems, configurations, and effects other than those described above.

DETAILED DESCRIPTION OF EMBODIMENTS

Next, examples of the present invention will be described using the drawings.

Example 1

Figure 1:
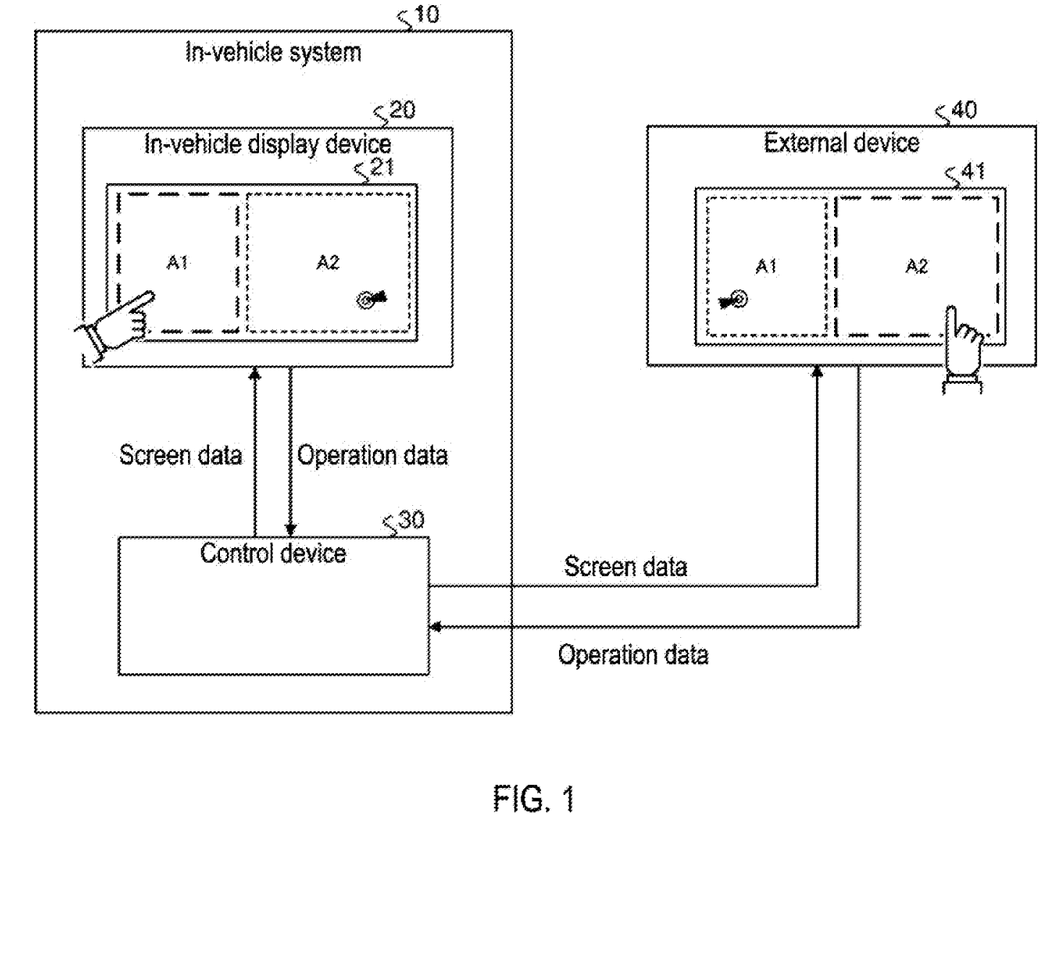
FIG. 1 is an explanatory diagram illustrating control of the in-vehicle display device of embodiment 1.

FIG. 1 is a diagram illustrating control of the in-vehicle display device (also referred to as a display device) of embodiment 1. An in-vehicle system 10 has an in-vehicle display device 20 and a control device 30. The in-vehicle display device 20 is a touch panel display installed in a vehicle, and the display can be operated by a driver touching the touch panel. The control device 30 is installed in the vehicle, generates screen data to be displayed on the in-vehicle display device 20, and processes operation data received by the in-vehicle display device 20. The control device 30 can communicate with an external device 40. The external device 40 is a device provided with a display, a touch panel for receiving an operation, and the like, and is, for example, a smartphone or the like carried by a vehicle occupant. The control device 30 provides screen data to the external device 40 and receives operation data received by the external device 40.

As illustrated in FIG. 1, the control device 30 is capable of mirroring to display the same screen on the in-vehicle display device 20 and the external device 40. The control device 30 can divide the screen into a plurality of areas. The control device 30 can set devices for performing input to the areas generated by the division. In the present embodiment, a device set as a device for performing input to a given area is referred to as a priority device of that area.

The control device 30 executes processing for each area based on the operation input by the priority device of that area and suppresses processing based on operations input by devices other than the priority device.

In FIG. 1, the control device 30 displays screens of the same content on a display 21 of the in-vehicle display device 20 and a display 41 of the external device 40. This screen is divided into an area A1 and an area A2. The priority device of the area A1 is the in-vehicle display device 20. The priority device of the area A2 is the external device 40.

In the in-vehicle display device 20 and the external device 40, display modes can be made different between an area where the own device is the priority device and an area where the own device is not the priority device. As one example, a frame line, a semi-transparent display, or the like may be used. FIG. 1 schematically illustrates differences in display modes by differences in line types of frame lines of the areas.

The control device 30 processes an operation received by the in-vehicle display device 20 in the area A1, and the operation received by the external device 40 in the area A1 is excluded from processing. The control device 30 processes an operation received by the external device 40 in the area A2, and the operation received by the in-vehicle display device 200 in the area A2 is excluded from processing.

The in-vehicle display device 20 receives an operation in the area A1, and the external device 40 displays the content of the operation received in the area A2. The external device 40 receives an operation in the area A2, and the in-vehicle display device 20 displays the content of the operation received in the area A1.

Figure 2:
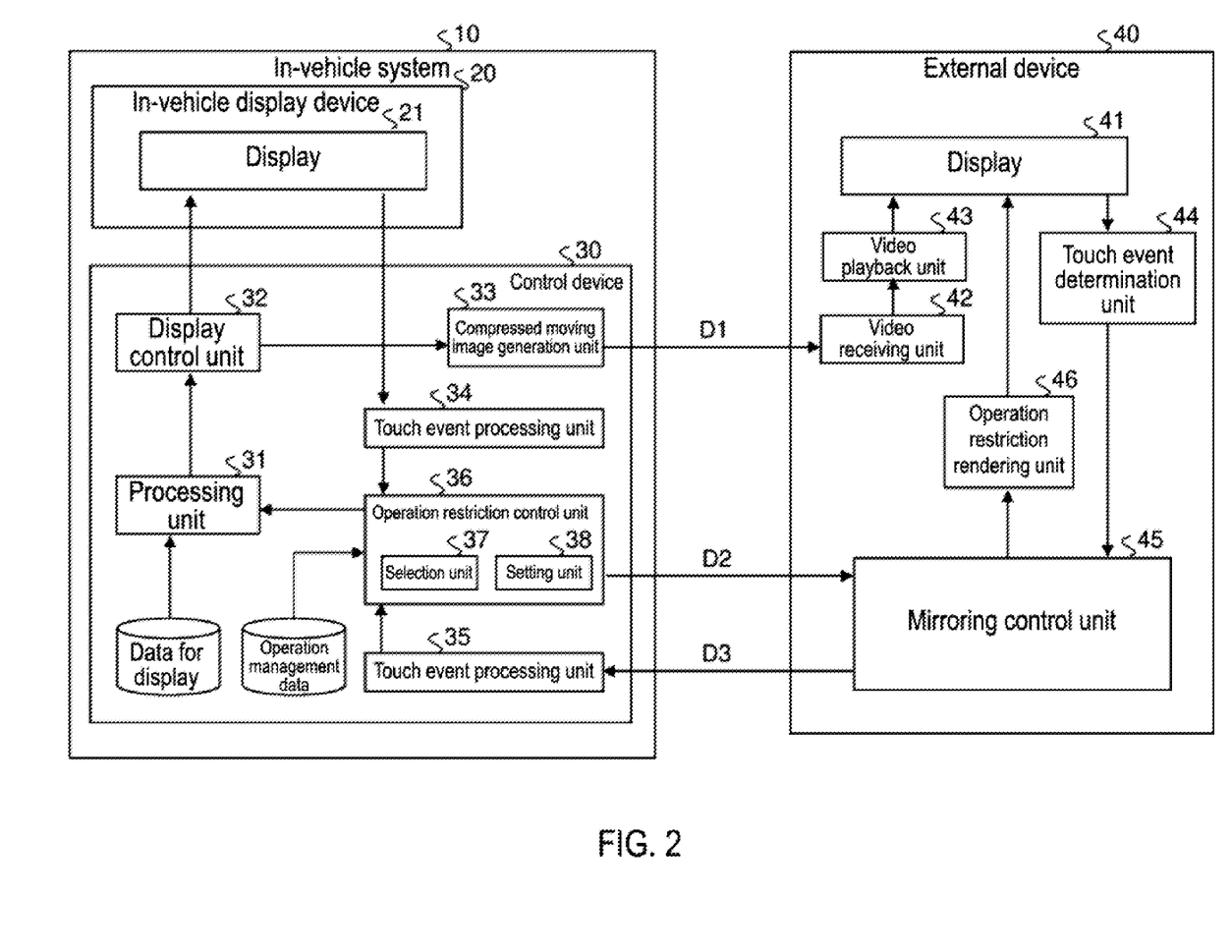
FIG. 2 is a configurational diagram of the entire system of embodiment 1.

FIG. 2 is a configurational diagram of the overall system of embodiment 1.

The in-vehicle display device 20 has a display 21 provided with a touch panel.

The control device 30 has a processing unit 31, a display control unit 32, a compressed moving image generation unit 33, a touch event processing unit 34, a touch event processing unit 35, and an operation restriction management unit 36.

The processing unit 31 generates a screen to be displayed on the display 21 based on the received operation and display data. The display data includes raw image data, text data, layout data, and the like.

The display control unit 32 transmits screen data D1 indicating a screen generated by the processing unit 31 to the in-vehicle display device 20 to display such. The display control unit 32 outputs screen data indicating the screen generated by the processing unit 31 to the compressed moving image generation unit 33.

The compressed moving image generation unit 33 converts the screen data D1 into a format of a compressed moving image and transmits such to the external device 40 by a protocol such as RTP (Real-time Transport Protocol) that can transmit a wireless path.

The touch event processing unit 34 acquires the operation received by the in-vehicle display device 20. The operation received by the in-vehicle display device 20 is a touch event such as a tap, a swipe, or a drag, on the touch panel.

The touch event processing unit 35 acquires the operation received by the external device 40. The operation received by the external device 40 is a touch event such as a tap, a swipe, or a drag on the touch panel.

The operation restriction management unit 36 has a selection unit 37 and a setting unit 38. A selection unit 37 selects the in-vehicle display device 20 or the external device 40. The device selected by the selection unit 37 is the priority device. The setting unit 38 sets, in a portion of areas in the screen, an area for executing processing based on an operation input to the priority device and for suppressing processing based on an operation input to a device other than the priority device. Through this setup, each area in the screen is associated with the device selected by the selection unit.

The selection unit 37 selects the in-vehicle display device 20 as a device in an area on a driver side of the screen. In other words, the in-vehicle display device 20 is associated with an area on the driver side of the screen. The selection unit 37 selects the external device 40 for an area excluding the area of the driver side. In other words, the external device 40 is associated with any of the areas excluding the area of the driver side.

The operation restriction management unit 36 references operation management data as necessary. The operation management data includes definition data of operable areas and definition data of level of priority for each model.

The operation restriction management unit 36 outputs the area, the priority device, and the touch event to the processing unit 31.

The operation restriction management unit 36 transmits the area and the priority device to the external device 40 as operation suppression data D2.

The processing unit 31 generates a screen based on the operation received by the priority device associated with each area in the screen.

While the same area is displayed on both the screen displayed on the in-vehicle display device 20 and the screen displayed on the external device 40, the processing unit 31 excludes processing for operations received by the device that is not selected for the area. In other words, the processing unit 31 associates different devices to each area of the screen, and assuming a device that is not associated with a given area receives an operation in that given area, this operation is not subject to processing by the processing unit 31.

The external device 40 has a display 41, a video receiving unit 42, a video playback unit 43, a touch event determination unit 44, a mirroring control unit 45, and an operation restriction rendering unit 46.

The video receiving unit 42 receives the screen data D1 in compressed moving image format. The video playback unit 43 decompresses the screen data D1 and displays such on the display 41.

The display 41 is provided with a touch panel. The touch event determination unit 44 determines an operation (tap, swipe, drag, or the like) on the touch panel as a touch event.

The mirroring control unit 45 transmits operation data D3 indicating a touch event to the touch event processing unit 35 of the control device 30.

The mirroring control unit 45 receives the operation suppression data D2 and outputs such to the operation restriction rendering unit 46.

The operation restriction rendering unit 46 differentiates the display modes of the operable area and the non-operable area based on the operation suppression data D2.

Figure 3:
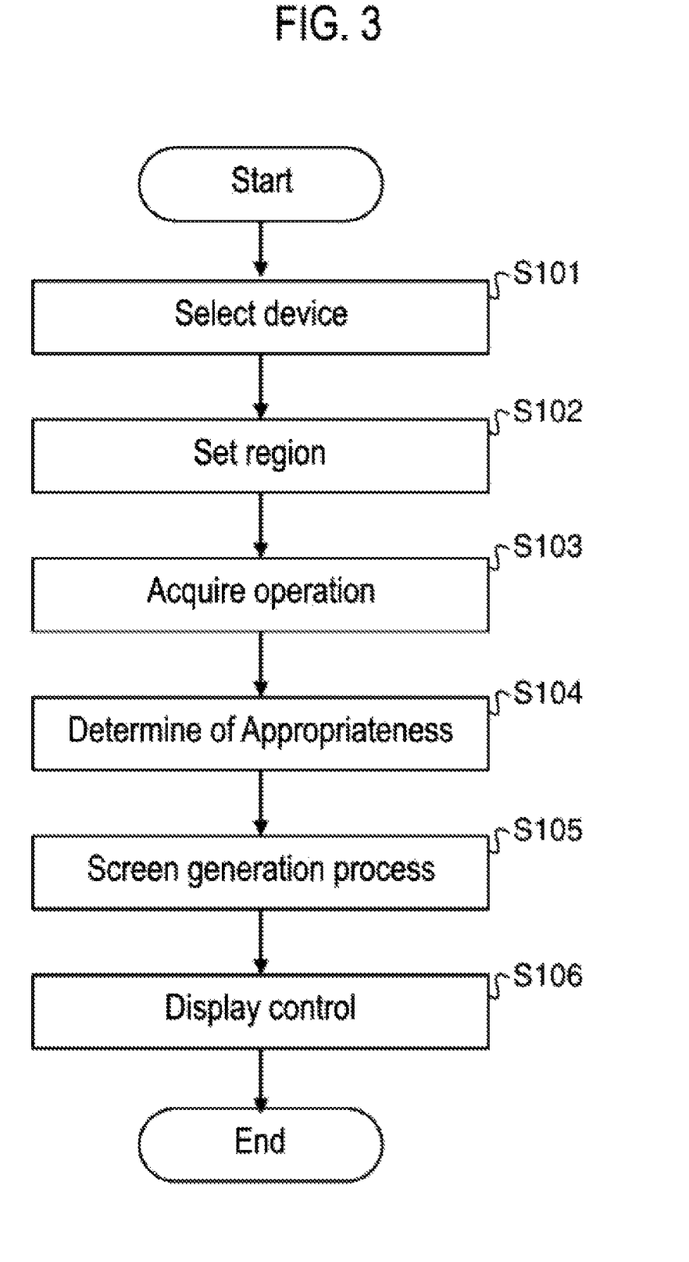
FIG. 3 is a flowchart illustrating control of the in-vehicle display device.

FIG. 3 is a flowchart of control of the in-vehicle display device. The control device 30 sequentially executes from the next step S101 to step S106.

Step S101—The selection unit 37 of the control device 30 selects the in-vehicle display device 20 or the external device 40. Thereafter, the process proceeds to step S102.

Step S102—The setting unit 38 of the control device 30 sets a priority device in each area of the screen. Thereafter, the process proceeds to step S103.

Step S103—The operation restriction management unit 36 of the control device 30 acquires the operation received by the in-vehicle display device 20 or the external device 40. Thereafter, the process proceeds to step S104.

Step S104—The operation restriction management unit 36 of the control device 30 determines a combination of an area and a device. When an operation is received from a priority device set to a given area, the process proceeds to step S105. When an operation is received from a device other than the priority device set in a certain area, the process does not proceed to step S105. At this time, the process returns to step S103.

Step S105—The processing unit 31 of the control device 30 generates a screen to be displayed on the in-vehicle display device 20 based on the operation received in step S104. Thereafter, the process returns to step S106.

Step S106—The display control unit 32 of the control device 30 transmits the screen generated by the processing unit 31 to the in-vehicle display device 20 as screen data D1. The display control unit 32 of the control device 30 causes the compressed moving image generation unit 33 to compress the screen data D1 and provides such to the external device 40.

Figure 4:
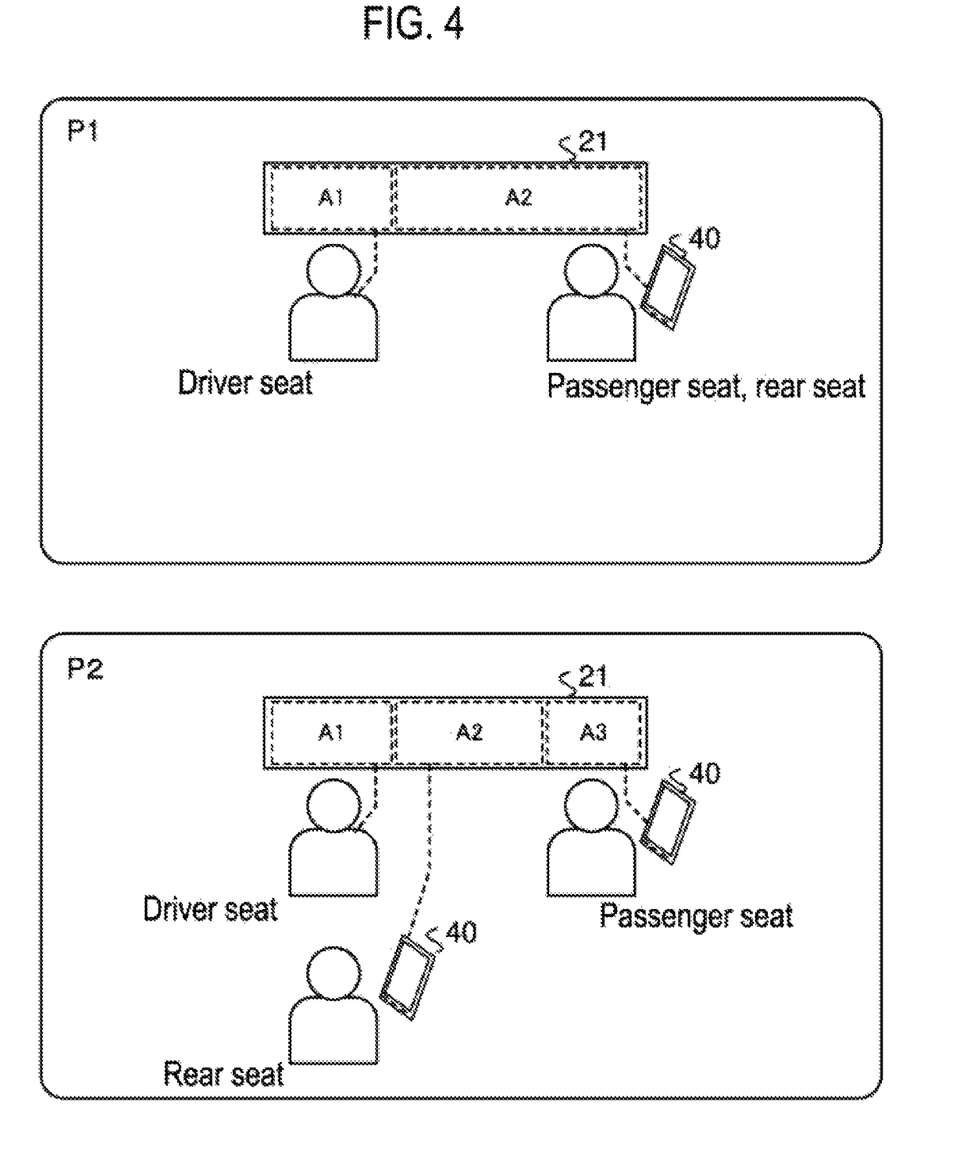
FIG. 4 is an explanatory diagram illustrating selection of the areas and the devices (part 1)

FIG. 4 is an explanatory diagram of selection of the area and the device on an oblong display 21 from in front of the driver's seat to in front of a passenger seat. In this case, the in-vehicle display device 20 is selected as the priority device in the area near the driver, which is located where the driver's hand can easily reach.

In pattern P1 illustrated in FIG. 4, the display area of the display 21 is divided into an area A1 and an area A2. The area A1 is an area near the driver's seat. The area A2 is everything other than the area A1 and does not include the area near the driver's seat. The priority device in the area A1 is the in-vehicle display device 20, and thus the driver can directly operate the area A1 displayed on the in-vehicle display device 20. The priority device in the area A2 is the external device 40. This is because the area A2 is far from the driver's seat, and thus it is inappropriate for the driver to directly operate the area A2. When the external device 40 is assigned as the priority device in the area A2, direct operation by the driver in the area far from the driver's seat is suppressed, and an occupant of the front passenger seat or a rear seat can operate the area A2 via the external device 40.

In pattern P2 illustrated in FIG. 4, the display area of the display 21 is divided into area A1 to area A3. The area A1 is an area near the driver's seat. The area A3 is an area near the front passenger seat. The area A2 is an area between the area A1 and the area A2. The priority device in the area A1 is the in-vehicle display device 20, and the driver can directly operate the area A1 displayed on the in-vehicle display device 20. The priority device in the area A2 is the external device 40, carried by an occupant in a rear seat. The priority device in the area A3 is the external device 40, carried by a passenger seat occupant. The in-vehicle display device 20 may be selected as the priority device in the area A3. Thus, when the control device 30 receives the input operation from the plurality of external devices 40, the area excluding the area of the driver side of the screen can be divided, and a different external device 40 can be selected for each divided area. In other words, the screen can be divided and assigned to a plurality of occupants other than the driver.

Figure 5:
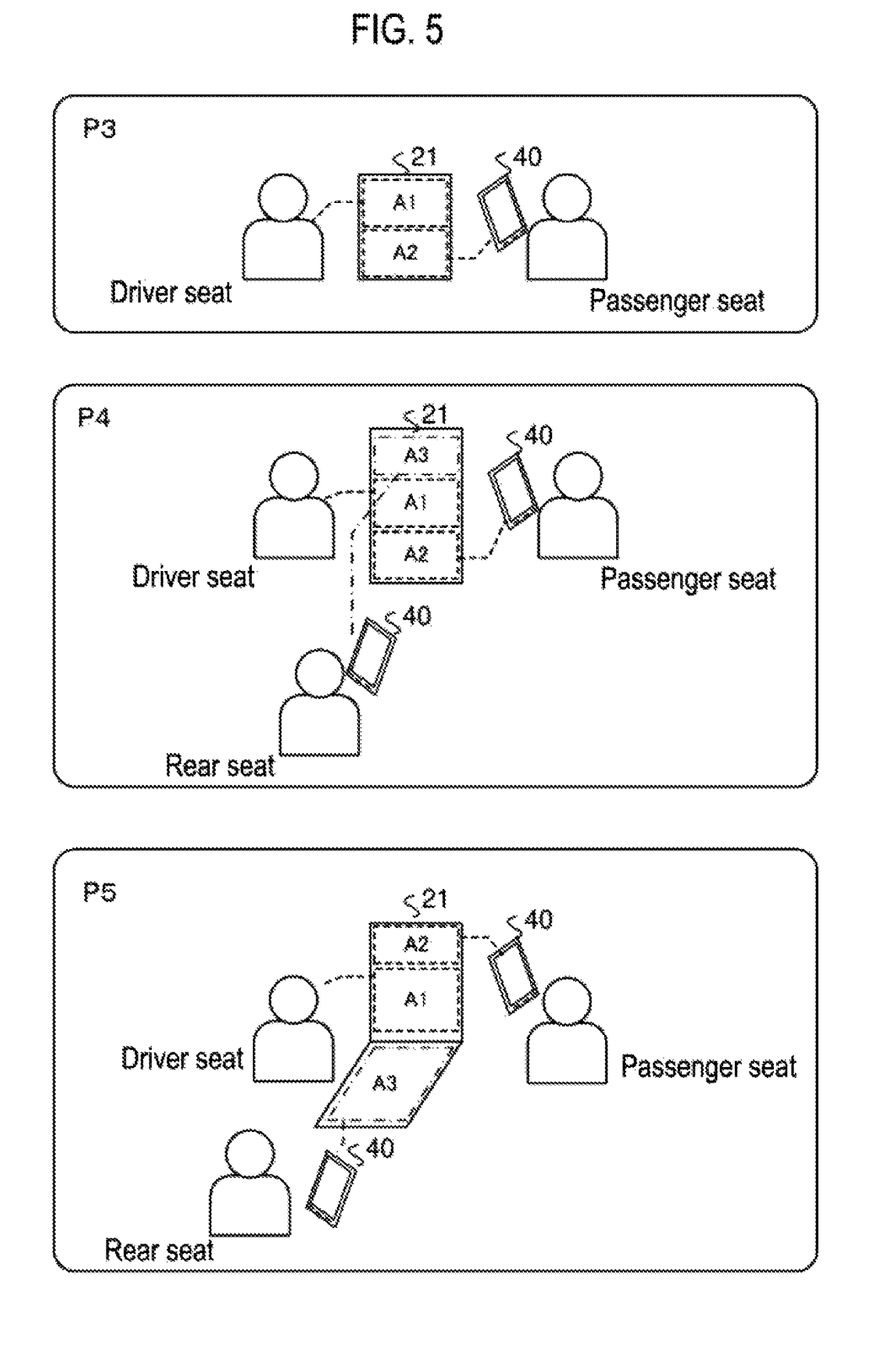
FIG. 5 is an explanatory diagram illustrating selection of the areas and the devices (part 2)

FIG. 5 is an explanatory diagram of selection of the areas and the devices on the oblong display 21. In this case, the in-vehicle display device 20 is selected as the priority device in an area in the center of the display or an area at the top of the display, which is located where the driver's hand can easily reach.

In pattern P3 illustrated in FIG. 5, the display area of the display 21 is divided into areas A1 and A2. The area A1 is on the upper side of the display 21 and is easily reached by the driver's hand. The area A2 is on the lower side of the display 21 and is more difficult for the driver's hand to reach than the area A1. Therefore, the priority device in the area A1 is the in-vehicle display device 20, and the driver can directly operate the area A1. The priority area in the area A2 is the external device 40, carried by a passenger seat occupant.

In pattern P4 illustrated in FIG. 5, the display 21 is longer lengthwise than in the pattern P3, and the upper end of the display 21 is located higher than in the pattern P3. In the pattern P4, the display area of the display 21 is divided into areas A1 to A3. The area A1 is near the center of the display 21 and is easily reached by the driver's hand. The area A2 is on the lower side of the display 21 and is more difficult for the driver's hand to reach than the area A1. The area A3 is on the upper side of the display 21 and is highly visible from the rear seat occupant. Therefore, the priority device in the area A1 is the in-vehicle display device 20, and the driver can directly operate the area A1. The priority device in the area A2 is the external device 40 of the passenger seat occupant. The priority device in the area A3 is the external device 40 of the rear seat occupant.

In pattern P5 illustrated in FIG. 5, the display 21 is longer lengthwise than in the pattern P3, and the lower side of the display 21 extends from near the armrest of the front seat while curving. In the pattern P5, the display area of the display 21 is divided into areas A1 to A3. The area A1 is near the center of the display 21 and is easily reached by the driver's hand. The area A2 is on the upper side of the display 21 and is more difficult for the driver's hand to reach than the area A1. The area A3 is on the lower side of the display 21, near the armrest of the front seat, and is highly visible from the rear seat occupant. Therefore, the priority device in the area A1 is the in-vehicle display device 20, and the driver can directly operate the area A1. The priority device in the area A2 is the external device 40 of the passenger seat occupant. The priority device in the area A3 is the external device 40 of the rear seat occupant.

Figure 6:
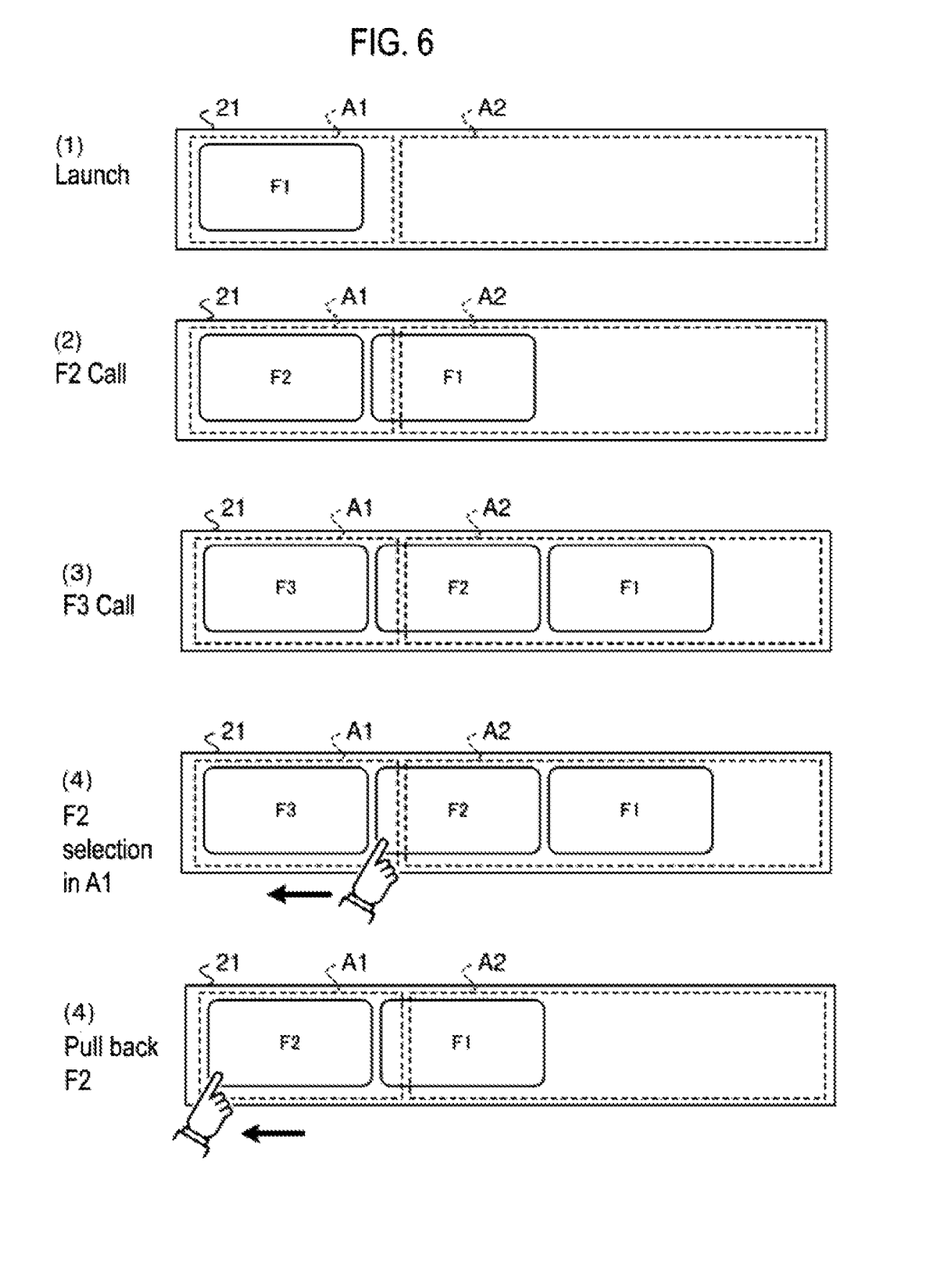
FIG. 6 illustrates a specific example of an operation that uses the areas.

FIG. 6 is a specific example of an operation that uses the areas. In FIG. 6, the display 21 is laterally long. The area A1 is set within a range near the driver's seat on the left side of the display 21, within the reach of the drive's hand, and the in-vehicle display device 20 is the priority device. To the right of the area A1 is the area A2, and the operation received by the in-vehicle display device 20 is suppressed.

When the control device 30 is started up, the control device 30 displays an object related to a function F1 in the area A1 (1). For example, the function F1 corresponds to an initial screen. The entire object relating to the function F1 is within the area A1, and thus the driver can touch any location on the object of the function F1 to operate such.

When the driver calls another function F2 different from the function F1, the control device 30 moves the object of the function F1 to the right and displays the object of the function F2 at the left end (2). The entire object of the function F2 is within the area A1, and thus the driver can touch any location on the object of the function F2 to operate such. Although a portion of the left end of the object of the function F1 remains in the area A1, the majority is pushed out to the area A2. The driver can operate the object displayed on the area A1 via the in-vehicle display device 20, and thus the control device 30 executes processing based on the operation of the in-vehicle display device 20 for the entirety of the function F2 and a portion of the function F1.

When the driver calls the function F3, the control device 30 moves the objects of the function F1 and the function F2 to the right and displays the object of the function F3 at the left end (3). The entire object of the function F3 is within the area A1, and thus the driver can touch any location on the object of the function F3 to operate such. Although a portion of the left end of the object of the function F2 remains in the area A1, the majority is pushed out to the area A2. The entire object of the function F1 is pushed out to the area A2. The driver can operate the object displayed on the area A1 via the in-vehicle display device 20, and thus the control device 30 executes processing based on the operation of the in-vehicle display device 20 for the entirety of the function F3 and a portion of the function F2.

By touching the portion of the object of the function F2 remaining in the area A1 to select such (4) and performing a drag operation, the driver can pull the entire object of the function F2 back into the area A1. Thus, by leaving a portion of the pushed out object in the operable area, the driver can perform an operation for returning the function F2 into the area A1. In this state, a portion of the function F1 returns to the area A1, and thus the entire object of the function F1 can be returned to the area A1 by repeating the pulling back operation.

In the example illustrated in FIG. 6, the display range of the object relating to the function and the operation acceptable area are made different, and by using the difference therebetween, it is possible to operate a desired function within a predetermined area. Therefore, safe operation by the driver can be achieved while effectively using a large screen.

FIG. 6 illustrates an example wherein the portion that remains partially in the area A1 is used in the pulling back operation, but the operation buttons may be arranged in the portion that remains partially, and the majority may be capable of operations on the extruded object. The pulling back need not necessarily be in contact with the object to be pulled back. The configuration may include pulling back by a swipe operation in the area A1.

As described above, the control device 30 disclosed in the embodiments generates a screen displayed on an in-vehicle display device 20, which is display device installed in a vehicle, and provides a screen corresponding to the screen of the in-vehicle display device 20 to an external device 40, being provided with: a selection unit 37 for selecting the in-vehicle display device 20 or the external device 40; a setting unit 38 for setting, in a portion of areas in the screen, an area for executing processing based on an operation input to the device selected by the selection unit 37 and for suppressing processing based on an operation input to a device other than the device selected by the selection unit; a processing unit 31 for generating a screen based on operations associated with each area in the screen that are received by devices selected by the selection unit; and a display control unit 32 for displaying the screen generated by the processing unit 31 on the in-vehicle display device 20 and providing a screen corresponding to the screen of the display device to the external device 40.

According to this control device 30, occupants can appropriately operate the screen from both the in-vehicle display device 20 and the external device. According to this control device 30, images can be shared, and operations are possible without competition.

The selection unit 37 selects the in-vehicle display device 20 as a device in an area on a driver's side of the screen.

According to this control device 30, by setting the screen displayed in the area near the driver to the area that prioritizes the operation from the in-vehicle display device 20, the driver can appropriately operate the in-vehicle display device 20 in a short time.

While the same area is displayed on both the screen displayed on the in-vehicle display device 20 and the screen displayed on the external device 40, the processing unit 31 excludes processing for operations received by the device that is not selected for the area.

According to this control device 30, even when different operations are input to the same screen displayed by mirroring, it is possible to prevent operations from competing.

The selection unit 37 selects the external device 40 for an area in the screen that excludes the area of the driver side.

According to this control device 30, the occupant can operate the screen displayed in an area far from the driver, the driver can concentrate on driving, and the occupant can freely operate the control device 30.

The selection unit 37 is a control device that, when the control device 30 receives the input operation from the plurality of external devices 40, divides the area excluding the area of the driver side of the screen and selects a different external device 40 for each divided area.

According to this control device 30, even when a plurality of external devices 40 are connected to the control device 30, the occupant can freely use the control device 30 without worrying about operation conflict.

Note that the present invention is not limited to the abovementioned examples and includes various modified examples. For example, while the abovementioned examples have been described in detail in order to describe the present invention in an easy-to-understand manner, the present invention is not necessarily limited to those with all the described configurations. Any of these configurations may be deleted, or any configuration may be added or replaced.

For example, this may be implemented as an in-vehicle device having the function of the in-vehicle display device 20 and the function of the control device 30. The display of the in-vehicle display device 20 need not match the display of the external device 40 perfectly, and one display may extend the other display. The in-vehicle display device 20 may be installed in a vehicle and may be a device provided with a display and a touch panel, and examples in which a portable tablet or the like is brought into the vehicle are included in the in-vehicle display device 20.

REFERENCE NUMERALS

10: in-vehicle system, 20: in-vehicle display device, 21: display, 30: control device, 31: processing unit, 32: display control unit, 33: compressed moving image generation unit, 34 and 35: touch event processing unit, 36: operation restriction management unit, 37: selection unit, 38: setting unit, 40: external device, 41: display, 42: video receiving unit, 43: video playback unit, 44: touch event determination unit, 45: mirroring control unit, 46: operation restriction rendering unit.

The invention claimed is:

1. A control device that generates a screen displayed on a display device installed in a vehicle and provides a screen, corresponding to the screen of the display device, to an external device, comprising:
a selection unit for selecting the display device or the external device;
a setting unit for setting, in a portion of areas in the screen displayed on the display device, an area for executing processing based on an operation input to the device selected by the selection unit, and for suppressing processing based on an operation input to a device other than the device selected by the selection unit;
a processing unit for generating a screen displayed on the display device based on operations associated with each area in the screen displayed on the display device that are received by devices selected by the selection unit; and a display control unit for displaying the screen generated by the processing unit on the display device and providing a screen corresponding to the screen of the display device to the external device, wherein the selection unit is a control device that, when the control device receives an input operation from a plurality of external devices, divides the screen displayed on the display device into a plurality of areas, excludes the area of the driver side of the screen, and selects a different external device for each remaining divided area, wherein while a same area is displayed on both the screen displayed on the display device and the screen displayed on the external device, the processing unit excludes processing for operations received by the device that is not selected for the same area.

2. The control device according to claim 1, wherein the selection unit selects the display device as a device in an area on a driver's side of the screen.

3. The control device according to claim 1, wherein the selection unit selects the external device for an area in the screen displayed on the display device that excludes the area of the driver's side.

4. A control method via a control device that generates a screen displayed on a display device and provides a screen corresponding to the screen of the display device to an external device, comprising the steps of:

selecting the display device or the external device with a selection unit;

setting, in a portion of areas in the screen displayed on the display device, an area for executing processing based on an operation input to the device selected by the selection unit, and for suppressing processing based on an operation input to a device other than the device selected in the selecting step;

generating a screen displayed on the display device based on operations associated with each area in the screen displayed on the display device that are received by devices selected in the selecting step; and displaying the screen generated via the processing step on the display device and providing a screen corresponding to the screen of the display device to the external device, wherein the selection unit is a control device that, when the control device receives an input operation from a plurality of external devices, divides the screen displayed on the display device into a plurality of areas, excludes the area of the driver side of the screen, and selects a different external device for each remaining divided area, wherein while a same area is displayed on both the screen displayed on the display device and the screen displayed on the external device, the processing unit excludes processing for operations received by the device that is not selected for the same area.

* * * * *